UNITED STATES PATENT OFFICE.

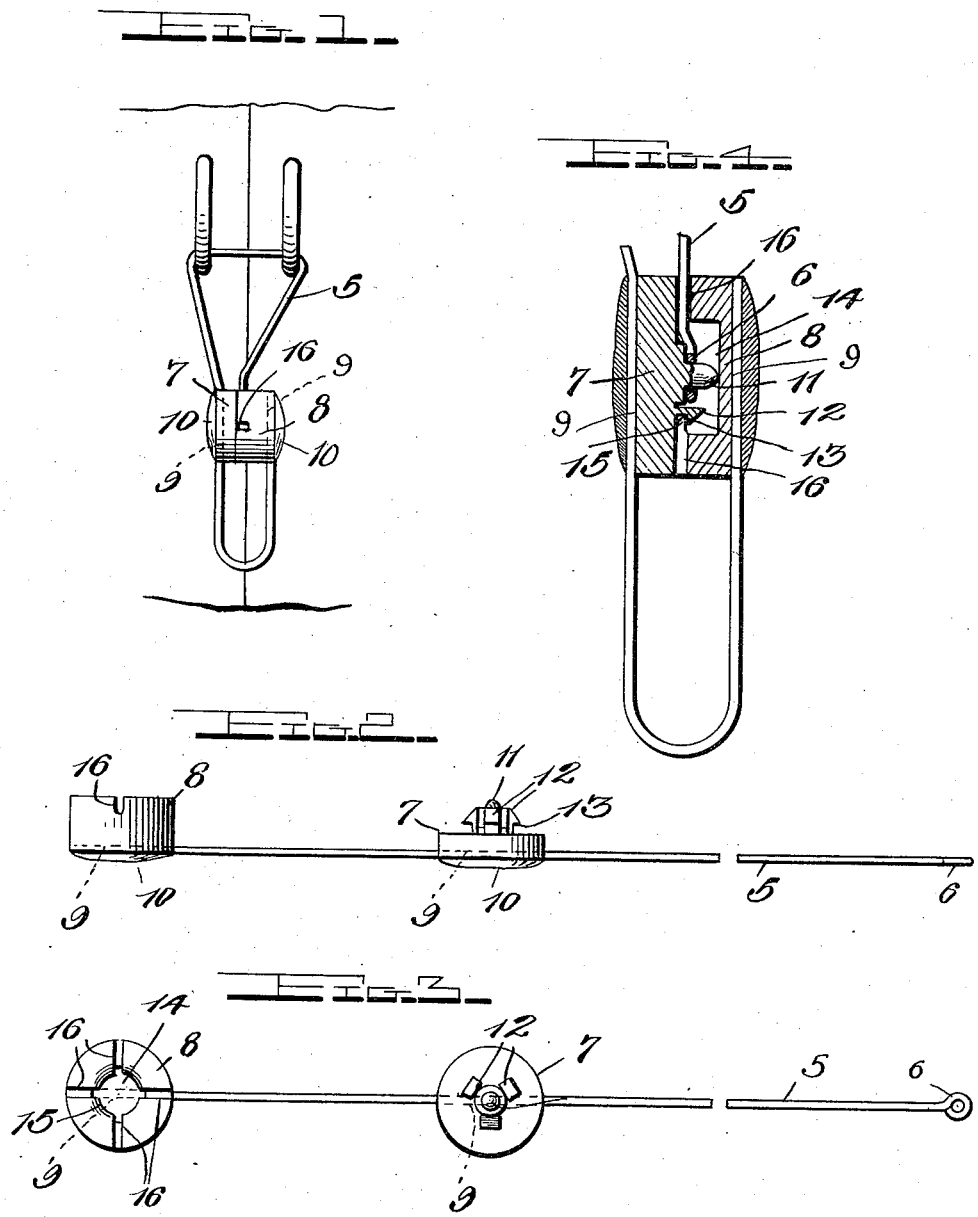

JAMES FREEMAN WEBB, OF FRANKVILLE, NOVA SCOTIA, CANADA.

SEAL.

1,059,689. Specification of Letters Patent. Patented Apr. 22, 1913.

Application filed November 23, 1912. Serial No. 733,137.

*To all whom it may concern:*

Be it known that I, JAMES F. WEBB, a subject of the King of England, residing at Frankville, in the county of Antigonish, Nova Scotia, Canada, have invented certain new and useful Improvements in Seals, of which the following is a specification, reference being had to the accompanying drawings.

This invention relates to improvements in seals such as are commonly used upon freight cars, packing and shipping cans and in other instances where a secure and effective seal is desirable.

The invention has for its primary object the provision of a seal of the above character which is extremely efficient as well as strong and durable in use and can be manufactured at comparatively small cost.

Another and more specific object of the invention resides in the provision of a body and a cap member soldered or otherwise secured to the sealing wire, and means carried by said members to securely hold the cap upon the body and retain one end of the sealing wire therebetween.

Another object of the invention is to provide a seal wherein the several parts may be easily and quickly manipulated and the car or receptacle expeditiously sealed without danger of cutting or otherwise injuring the hands.

With the above and other objects in view as will become apparent as the description proceeds, the invention consists in certain constructions, combinations and arrangements of the parts that I shall hereinafter fully describe and claim.

For a full understanding of the invention, reference is to be had to the following description and accompanying drawing, in which—

Figure 1 is a side elevation of my improved seal showing the same attached to the staples of a car door or other part to be sealed; Fig. 2 is a similar view of the parts of the seal disconnected; Fig. 3 is a plan view of the body of the seal and its cap showing the wire connecting the same; and Fig. 4 is an enlarged section through the seal body and cap connected together.

Referring in detail to the drawing, 5 designates a wire provided upon one end with a loop or eye 6.

7 indicates the body or seal which is in the form of a metal disk and 8 indicates the cap. The seal body and the cap are each provided in one face with a groove indicated at 9 in which the sealing wire 5 is adapted to be disposed. The cap 8 is arranged upon the end of the wire while the body member 7 is secured upon said wire in spaced relation to said cap. After the sealing wire has been laid in the grooves of the cap and body of the seal, it is permanently secured thereto by means of solder indicated at 10. The body 7 of the seal is provided with a stud 11 projecting centrally from one of its faces and adjacent to this stud a plurality of heavy locking springs 12 are secured upon the body member. These springs are provided with shoulders indicated at 13 for a purpose which will be hereinafter seen.

The cap 8 is provided with a central circular socket or recess 14 in one face, and said cap at the edge of said recess is provided with an inwardly turned flange 15. The face of the cap 8 is provided with a plurality of radially extending grooves or channels 16 which open into the socket or recess.

In the use of my improved seal, the end of the wire 5 having the eye or loop thereon is first passed through the staples or other elements to be connected and said eye is engaged over the central stud or pin 11 on the body member 7. The wire 5 between the body member and the cap 8 is now bent and said cap arranged upon the body member, the stud 11 and springs 12 extending into the socket or recess 14 of the cap. The end of the wire 5 adjacent to the eye 6 is received in one of the radial grooves 16 in the face of the cap. This cap may be readily forced into locking position by means of the fingers and the shoulders 13 of the springs 12 engage over the inwardly turned flange 15 of said cap, said springs being sprung inwardly slightly toward the stud as the cap is forced into position upon the body member. It will thus be apparent that when the body member and the cap are connected in this manner, the possibility of their separation is precluded.

From the foregoing it will be seen that I have produced a simple and effective seal, the elements of which may be easily and quickly connected.

While I have illustrated the body member and cap as of circular form, it will be obvious that they can be of any other preferred form and may also be manufactured of other metal than brass if desired. The number of locking springs 12 may also be multiplied to any extent in accordance with the size of the seal and the particular purpose for which the same is employed. The invention is also susceptible of other modifications in the form, proportion and arrangement of the several elements within the scope of the claim without departing from the essential features or sacrificing any of the advantages thereof.

Having thus described the invention, what is claimed is:

In a seal of the class described, a flexible wire having an eye on one end, a body member, a cap, means for securing said body member and cap to the wire in spaced relation to each other, a stud centrally projecting from one face of the body member to receive said eye, a plurality of locking springs arranged upon the body member contiguous to said stud and each provided with a shoulder, said cap having a central recess and an inturned flange at the edge of the recess to be engaged by the shoulders of said springs to retain the cap upon the body member, said cap also having a plurality of radial grooves opening into said recess, one of said grooves being adapted to receive the end of the wire adjacent to the eye thereof.

In testimony whereof I hereunto affix my signature in the presence of two witnesses.

JAMES FREEMAN WEBB.

Witnesses:
MABEL MADER,
JOSEPH A. WALL.

Copies of this patent may be obtained for five cents each, by addressing the "Commissioner of Patents, Washington, D. C."